United States Patent [19]
Bellavance et al.

[11] 4,116,530
[45] Sep. 26, 1978

[54] OPTICAL WAVEGUIDES GROWN BY SELECTIVE LIQUID PHASE EPITAXY

[75] Inventors: David W. Bellavance, Dallas, Tex.; Joe C. Campbell, Highlands, N.J.

[73] Assignee: Texas Instruments Incorporated, Dallas, Tex.

[21] Appl. No.: 709,554

[22] Filed: Jul. 29, 1976

[51] Int. Cl.$^2$ .............................................. G02B 5/14
[52] U.S. Cl. .................................................. 350/96.12
[58] Field of Search ............. 350/96 WG; 357/17, 19; 148/175

[56] References Cited
U.S. PATENT DOCUMENTS

| | | | |
|---|---|---|---|
| 3,850,503 | 11/1974 | Riseberg | 350/96 WG |
| 4,007,978 | 2/1977 | Holton | 350/96 WG |

OTHER PUBLICATIONS

Ralston et al., "Double Heterostructure $Pb_{1-x} Sn_x$ Te Waveguide at 10.6 μm" Applied Physics Letters vol. 26, No. 5, Jan. 15, 1975 pp. 64–66.

*Primary Examiner*—John K. Corbin
*Assistant Examiner*—R. Hille
*Attorney, Agent, or Firm*—James T. Comfort; Rene' E. Grossman; Stephen B. Goldman

[57] ABSTRACT

This disclosure concerns optical waveguides of arcuate structure fabricated by selective liquid phase epitaxy. In integrated optical circuits requiring complex processing, it will be necessary to utilize at relatively low light losses bends, curves, and dividers in the waveguide section. The arcuate optical waveguides described herein have a region of higher index of refraction surrounded by lower effective index media to confine and propagate light between active components of an integrated optical circuit. Optical waveguides extending around bends are grown by selective liquid phase epitaxy employing a horizontal graphite boat with sliding compartments, wherein multiple layers of $Ga_{1-x}Al_x$·$As(0 \leq x \leq 0.3)$ are grown. For a relatively low radius of curvature where $r_c = 10$ mils, the angle is dominated by a sharp facet, with the faceting slowly decreasing as the radius of curvature increases, until at $r_c = 25$ mils, substantially smooth sides are formed around the bend of the optical waveguide. One specific configuration of an arcuate optical waveguide structure is a y-shaped waveguide, where each of its legs may have a different specific radius of curvature.

11 Claims, 4 Drawing Figures

OPTICAL WAVEGUIDES GROWN BY SELECTIVE LIQUID PHASE EPITAXY

BACKGROUND OF THE INVENTION

This invention relates to a method of growing dielectric optical waveguides and more particularly to optical waveguides of arcuate structure grown preferentially by selective liquid phase epitaxy.

As improved sources and associated devices have been and continue to be developed, the feasibility of optical data processing systems is becoming an acceptable premise. In this connection, the integration of optical devices in a manner similar to the well-known integrated circuit may enable multiple data processing functions to be performed on a small area of material, provided the necessary miniaturization of the optical components and integration of the separate functions can be achieved. In general, integrated optics would include, for example, a source for light generation, propagation, modulation and directional coupling, wherein all of these functions are integrated so as to take place on a single substrate. Integrated optics as herein described is more fully disclosed in "Integrated Optics," Esther M. Conwell, *Physics Today*, May, 1976.

A key element in the integrated optical circuit is the optical waveguide that confines the propagation of light not only in straight lines, but also around bends, and at relatively low losses. In integrated optical circuits requiring complex processing of information, it will be necessary to utilize bends, curves, and dividers in the waveguide section. The previously known waveguides are based on having a region of higher index of refraction surrounded by lower effecting index media to confine and propagate the light between active components of the integrated optical circuit. For slab waveguides this has been accomplished either by changing the carrier concentration or type or by changing the composition of the layers. Straight channel waveguides have been fabricated by a number of different techniques to confine and propagate the light between active components of the integrated optical circuit. These techniques include electro-optical stripelines, diffusion, proton bombardment, metal gap guides, and various etched techniques such as optical stripelines, rib waveguides, and etched channel waveguides.

The lowest loss optical waveguides are those which have the smoothest confining interfaces and the smallest refractive index steps. Thus, a deeply etched channel waveguide consequently having roughly etched sidewalls causes radiation to be scattered into untrapped modes. The ribbed waveguide and the dielectric strip waveguide both involve a structure in which the lateral change in the index of refraction is very small. When these waveguides are formed into arcuate structures, this index of refraction discontinuity in the lateral direction causes the light confined around a bend structure to be very poor.

Although low loss straight channel waveguides have been described in literature using a number of these techniques, there is little experience with bends in going around corners or in other arcuate structures. It was previously believed that any epitaxial growth of arcuate semiconductor structures would result in a geometric structure having sharply faceted sidewalls which would scatter the light being propagated therethrough into untrapped modes. Calculations based on Butler's waveguide theories and experimental data (presented at the Device Research Conference at Salt Lake City in June of 1976; submitted for publication in *Journal of Applied Physics* in September of 1976) indicate that for thin dielectric stripeline waveguides with a large discontinuity in the index of refraction, transmission of only 60% can be obtained for a radius of curvature of 125 mils. Such losses are impractical for complex processing in integrated optical circuits, and larger radii which will provide for lower losses are also impractical due to the greater chip surface area they would occupy.

Dielectric optical waveguides and a method for fabricating the same by vapor phase epitaxy for straight configurations have been taught to us by D. W. Shaw, copending U.S. patent application Ser. No. 458,628, filed Apr. 8, 1974, assigned to Texas Instruments Incorporated, the same assignee of this patent application. In accordance with the teachings of Shaw, the straight optical waveguides comprise layers of semiconductor material of the same conductivity type, wherein one of the semiconductor layers has a relatively high refractive index, while the other semiconductor layers have a relatively low refractive index with the light being propagated through the semiconductor layer having the relatively higher refractive index. The substrate is a semiconductor material crystallographically oriented to expose a surface parallel to a relatively fast growing plane or subsequent vapor phase epitaxial growth.

The dielectric mask opening is oriented on the planar surface of the substrate material in such a manner that the sides and end walls of the opening in the dielectric mask will be oriented to lie in planes parallel to the slow growing crystallographic planes of the semiconductor substrate. The preferred orientation of the dielectric mask opening to the crystallographic planes of the substrate allows for the formation of an optical waveguide wherein each of its four planar surfaces including top, bottom, and side surfaces are formed as smooth planar faceted growth surfaces.

SUMMARY OF THE INVENTION

This disclosure describes optical waveguides of arcuate structure having nonfaceted sidewalls as viewed at 2000× grown preferably by selective liquid phase epitaxy in which the lateral discontinuity in the index of refraction is relatively large, and the resulting confinement is superior to the conventional rib waveguide in dielectric strip waveguide structures. The arcuate epitaxially grown waveguide structure comprises a substrate of semiconductor material having a planarized surface; at least one arcuate semiconductor structure having a low index of refraction as an optical barrier layer; and an arcuate semiconductor structure having a high index of refraction as a light guiding region. All of the structures have been grown using the conventional horizontal graphite boat with sliding compartment, L. R. Dawson, *Journal of Crystal Growth*, Vol. 27, p. 86, 1974, wherein multiple layers of $Ga_{1-x}Al_xAs$ ($0 \leq x \leq 0.3$) have been grown with these structures. However, it is contemplated that selective vapor phase epitaxy is suitable in growing the waveguide structures where materials such as $Ga_{1-x}In_xAs$, $GaAs_{1-x}P_x$, or $Ga_{1-x}In_xAs_{1-y}P_y$ are used.

Selective liquid phase epitaxy has been previously used to grow straight sections for cleaved laser devices, for mesa laser structures, for straight line structures, and unique structures for other semiconductor applications. However, all previous epitaxial growth has concerned only linear straight line sections with no arcuate structures described or suggested.

Accordingly, an object of the present invention is to provide optical waveguides of bends, curves, and dividers providing for low loss propagation of light between active components of an integrated optical circuit.

Another object of the invention is to provide optical waveguides of arcuate configurations having small radii of curvature.

Another object of the invention is to provide optical waveguides of arcuate structures whose sidewalls are relatively smooth to prevent the scattering of light while travelling around bends.

Yet another object of the invention is to provide optical waveguides of arcuate structures grown preferentially by selective liquid phase epitaxy in integrated optical circuits.

BRIEF DESCRIPTION OF THE DRAWINGS

The invention, together with its various features and advantages, can be easily understood from the following, more detailed description taken in conjunction with the accompanying drawings in which.

DETAILED DESCRIPTION

Low loss optical waveguiding has been obtained in the arcuate structures described below having radii of curvature of only 25 mils.

Figure 1:
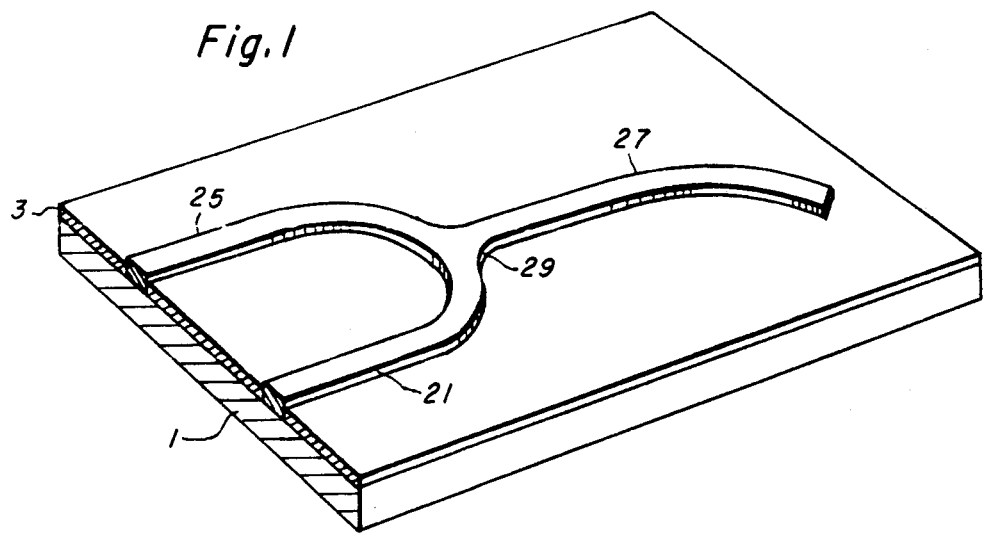
FIG. 1 is a perspective view showing the final state in the fabrication of an optical waveguide by selective liquid phase epitaxy in accordance with the present invention.
Figure 2:
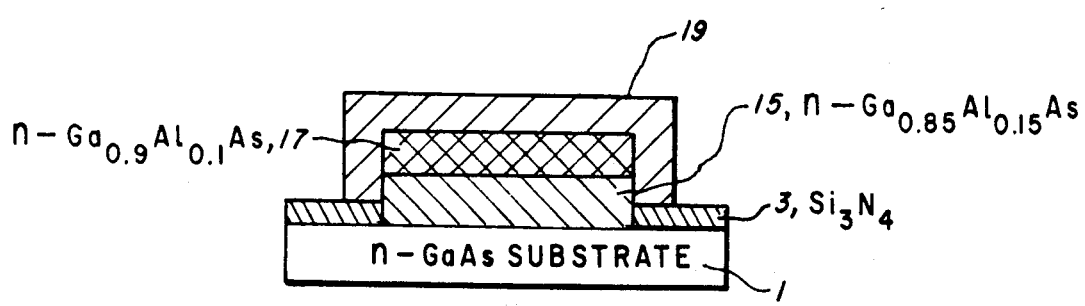
FIG. 2 is a cross-section of an embedded optical waveguide grown by selective liquid phase epitaxy in accordance with the present invention.

FIG. 1 depicts an embodiment of the present invention showing an optical waveguide structure that is grown by selective liquid phase epitaxy consisting of the various arcuate structures such as a bend segment 27 having a radius of curvature of less than 125 mils and a divider 29 utilizing curved legs 21 and 25 having a radius of curvature of less than 125 mils. The substrate has a major surface upon which a dielectric mask is deposited and upon which the waveguide structure is epitaxially grown. The waveguide geometry is patterned in the photoresist, and the waveguide opening is then etched into the dielectric mask. The optical waveguide structure is grown in the opening of the dielectric mask, and may consist, for example, of a one- or two-layer heterojunction structure. FIG. 2 shows a cross-section of a three-layer embedded waveguide structure grown by liquid phase epitaxy through the opening of the dielectric mask on the semiconductor substrate.

The optical waveguide cross-section structure shown in FIG. 2 is fabricated by constructing a patterned mask on the substrate material as shown in FIG. 1. Sequential layers of Group III-V semiconductor material are epitaxially grown through the openings of the mask to produce the embedded waveguide structure. Optical waveguide structures comprising single or double semiconductor heterojunction structures may be grown by selective liquid phase epitaxy containing arcuate structures of this invention. The double heterojunction embedded waveguide structure is fabricated by first growing a low index of refraction layer onto the substrate material through the opening in the dielectric mask. The active waveguide region which consists of a higher index of refractive semiconductor material is then deposited on the first-grown semiconductor layer. Finally, the double structure is embedded by a lower index of refraction material whose composition is similar to that of layer 15.

FIG. 1 shows that arcuate waveguide structures may be grown through the opening of a dielectric mask which is oriented in any selected orientation to the crystallographic planes of the substrate and may also be assembled in any sequence desired. For a radius of curvature of less than 10 mils, the sidewalls of the waveguide structure are dominated by sharp facets; however, at a radius of curvature of 25 mils, the faceting disappears, and the optical waveguide structure in the curved region comprises smooth sidewalls. The absence of faceting is visibly apparent at magnification of 2000×. The smooth sidewalls decrease the losses one might expect around such bends by preventing the scattering of light into untrapped modes.

In Group III-V semiconductor materials, the rate of crystal growth is dependent upon the selection of the crystallographic planar orientation of the substrate upon which the epitaxial layer is desired to be grown. In the case of Group III-V semiconductor materials, the fast growth plane is the {100} plane. In epitaxial deposits which are grown on a (100) semiconductor substrate surface, the epitaxial deposit is formed as a crystal extension of the lattice of the substrate, and growth is substantially in the [100] direction. This selective growth orientation allows for the relatively fast growth normal to the {100} direction and produces a top surface of smooth crystalline facets.

Straight sections previously have been grown with the long dimension oriented parallel to {100} or a {110} plane. This may be useful for certain device requirements but is not a condition for the growth of this structure. In fact, the arcuate waveguide mask may be oriented across any crystallographic planes of the substrate material to produce the desired results of the present invention.

The transverse cross-section of the epitaxial strips of semiconductor material included in the optical waveguides constructed in accordance with the present invention may be rectangular. However, the slow crystallographic growth of the side surfaces of an epitaxial strip of semiconductor material may proceed in such a manner as to impart a trapezoidal transverse cross-section to the strip, wherein the side surfaces, although formed as smooth faceted growth planar surfaces, are disposed at slight angles from a perpendicular to the top and bottom surfaces of the strip.

Substrate 1 is selected from any Group III-V semiconductor material such as n-GaAs and comprises a large planar area having a polished surface upon which the waveguide structure is epitaxially grown. The surface of the substrate is oriented in the [100] direction. However, other planar orientations may be utilized with the methods of the present invention, for example, {110} plane. A dielectric mask layer 3 is deposited over the entire substrate material by known techniques such as plasma deposition to a thickness of about 2,000 angstroms. The composition of the mask comprises any suitable dielectric material, for example, silicon nitride.

Figure 3:
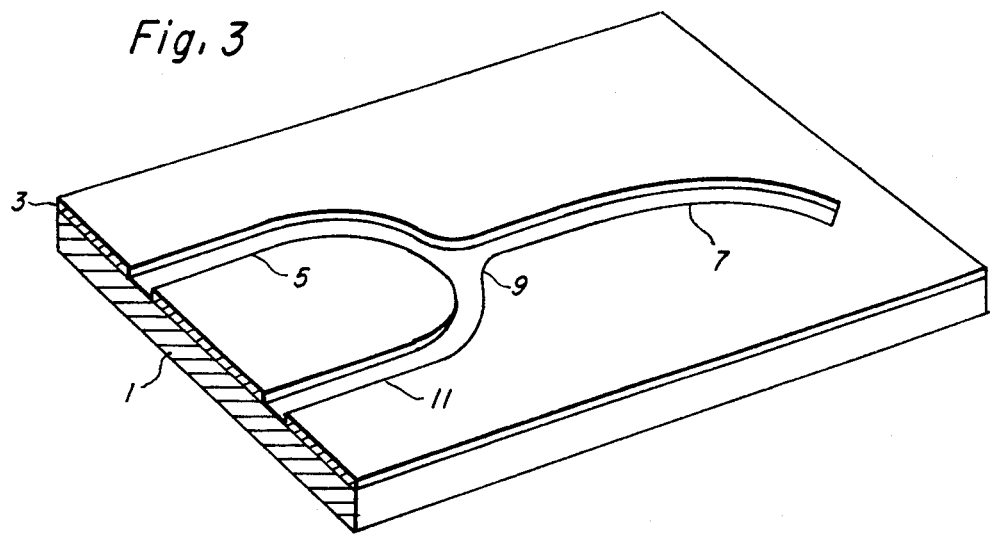
FIG. 3 is a perspective view showing a semiconductor substrate provided with a patterned mask on one surface thereof in the growth of an optical waveguide of semiconductor material in accordance with the present invention.

The waveguiding structure as shown in FIG. 1 is now patterned onto the dielectric mask by using standard photolithographic techniques. The arcuate pattern is opened in the mask to allow for the epitaxial deposition of the waveguiding structure onto the substrate material. Openings comprising a bend 7, a y-divider 9, and curved legs 5 and 11 are shown in FIG. 3. To obtain smooth sides on the waveguiding structure with little or no faceting, a radius of curvature greater than 25 mils is employed. However, smaller radii of curvature may be used by the methods of the present invention, but the angle will be dominated by faceting with a subsequent loss of light transmission. Any desired arcuate structure may be patterned in the dielectric mask.

After completion of the optical waveguide mask, an embedded double heterojunction waveguide structure configuration of arcuate design is grown according to one embodiment of this invention. The cross-section of such a waveguide figure is shown in FIG. 2. However, other embodiments including single heterojunction waveguide structures of arcuate configuration are also grown by the methods of this invention.

The three epitaxially grown layers 15, 17, and 19 consist of undoped n-type Group III–V semiconductor materials. All three layers are epitaxially grown by liquid phase epitaxy using a conventional horizontal graphite boat with sliding compartments. The first epitaxially grown layer 15 is an optical barrier having a low index of refraction whose composition is typically $Ga_{0.85}Al_{0.15}As$. The first layer is grown to a height of about 1.5 microns and covers the width of the opening in the dielectric mask which is about 10 to 25 microns. This first epitaxially grown mesa region will have a top surface which is parallel to the substrate surface and sides comprising smooth crystallographic planes having no faceting in the curved region. This mesa region will provide a base for the epitaxial growth of the active waveguiding region 17.

In order to form the optical waveguide region, the second epitaxial layer, when grown on top of the first epitaxial layer 15, must have a different refractive index. The index of refraction of the light propagation layer must be higher than the bordering layers 15 and 19 in order to trap the light. The waveguiding region Group III–V semiconductor material has a typical composition of $n\text{-}GA_{0.9}Al_{0.1}As$. However, other suitable compositions may also be used for the methods of this invention. The optical waveguiding region 17 is now sequentially epitaxially grown on top of the first layer 15 by the technique already mentioned. The layer will be approximately 2 microns in thickness and extend across the total planar surface of the first epitaxially grown layer 15. The top surface of the waveguiding layer will be parallel to the substrate surface 1 and will consist of a smooth crystalline growth. The sidewalls of the waveguiding region 17 will, like the first epitaxially grown layer 15, comprise smooth crystalline planes having no faceting in the curved region.

The difference between the index of refraction of the waveguide propagation region and the surrounding barrier layers may be quite small. For example, light will be trapped within the propagation region when the difference between the index of refraction is about 0.0005. This difference in the index of refraction of the different waveguide layers is achieved by changing the concentration of Al in the respective layers according to the formula $Ga_{1-x}Al_xAs$.

The final epitaxially grown layer 19 is similar in composition to the first epitaxial layer 15. This epitaxial layer will have a lower index of refraction than the wave propagation layer 17, as it behaves as an optical barrier like the first layer 15. Again, it may be any suitable n-GaAlAs material. The growth of this final epitaxial layer completes the waveguide structure as shown in FIG. 2 in cross-section and in FIG. 3 in perspective. The thickness of this final barrier layer is also approximately 2 microns.

Another embodiment of this invention is a single hetero-junction arcuate waveguide structure comprising a semiconductor substrate having a planarized surface; a first semiconductor structure of arcuate geometry having a low index of refraction grown onto the substrate through a patterned mask; and a second semiconductor structure of arcuate geometry comprising a light confining region grown onto the first arcuate structure and having a high index of refraction.

In yet another embodiment of this invention, a singly ribbed epitaxially grown waveguide of arcuate structure is grown through a patterned mask onto a GaAs substrate. The ribbed waveguide has a higher index of refraction than the substrate by having a composition such as $Ga_{1-x}In_xAs$.

One particular embodiment of the present invention that was subjected to testing consisted of a y-shaped structure, with a radius of curvature in one leg equal to 0 mils (9° angle of incidence) and in the other leg equal to 50 mils. Waveguiding of light was observed in both legs of the y-shaped waveguide, the output of the light for $r_c = 50$ mils being about twelve times greater than for $r_c = 0$ mils for the same power input.

Figure 4:
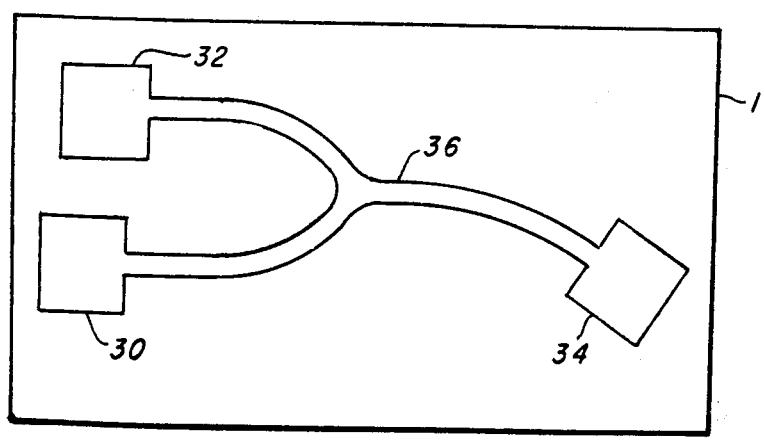
FIG. 4 is a top view showing an integrated optical circuit having three active components connected by arcuate optical waveguides grown in accordance with the present invention.

These arcuately grown structures 36 are used to connect active components of an integrated optical circuit as shown in one embodiment of FIG. 4. The active components are represented by rectangular boxes 30 comprising a modulator, 32 comprising a directional coupler, and 34 comprising an I-bar laser. However, other active components may be utilized in addition to other arcuate structures and assembled in different relationships.

In summary, a heterojunction arcuate optical waveguide structure is grown by selective liquid phase epitaxy upon a {100} orientation substrate consisting of any Group III–V semiconductor material. The optical waveguide as shown in FIG. 1 comprises arcuate structures as contrasted to linear segments as described in prior art. The optical waveguide itself as shown in FIG. 2 comprises three regions: a first region and a third region that act as light barriers having lower effective index of refraction than the second embedded waveguide propagation area which has a higher effective index of refraction. All three of these layers comprise Group III–V semiconductor material having typical formulas of $n\text{-}Ga_{1-x}Al_xAs$, wherein the preferred values of x are in the range of ($0 \leq x \leq 0.3$). However, values of x outside this range are also operative with the methods of the present invention. The substrate mask as shown in FIG. 3 may be oriented in a nonpreferred orientation to the crystallographic planes of the substrate surface 7 which may be oriented in the [100] direction. Growth of the optical waveguide structure itself is mainly normal to the (100) crystallographic plane of the substrate surface.

While particular embodiments of this invention have been disclosed herein, it will be understood that various modifications may become apparent to those skilled in the art without departing from the spirit and scope of the invention which is defined by the appended claims.

What is claimed is:

1. An epitaxially grown arcuate optical waveguide comprising:
   an arcuate semiconductor structure having a high index of refraction for guiding light, said structure having a radius of curvature in the range of about 25-125 mils, said structure having smooth side walls substantially free of faceting thereby preventing the scattering of light propagating therethrough into untrapped modes;
   at least one semiconductor barrier layer of low refractive index in contact with said arcuate optical waveguide; and
   a planarized semiconductor substrate for support of said arcuate optical waveguide.

2. A structure as set forth in claim 1, wherein said composition of said waveguide structure comprises a Group III-V semiconductor material.

3. An optical waveguide of semiconductor material including a substrate and monolithic configuration epitaxially grown thereon of arcuate geometry comprising:
   a substrate of semiconductor material having a first index of refraction and a planarized surface, and
   a non-linear optical waveguide structure of arcuate geometry grown thereon having a second index of refraction higher than said first index of refraction, said structure having a radius of curvature in the range of about 25-125 mils, said structure having smooth sidewalls substantially free of faceting thereby preventing the scattering of light propagating therethrough into untrapped modes;
   said arcuate structure having radii of curvature that lie in a plane parallel to said substrate surface.

4. A structure as set forth in claim 3, wherein said composition of said waveguide structure comprises a Group III-V semiconductor material.

5. An optical waveguide of semiconductor material including a substrate and monolithic structural configurations epitaxially grown thereon of arcuate geometry comprising:
   a substrate of semiconductor material having a planarized surface,
   a first semiconductor structure grown thereon of arcuate geometry having a first index of refraction, and
   a second semiconductor structure of arcuate geometry comprising a light confining region grown onto said first structure having a second index of refraction higher than said first index of refraction, said second structure having a radius of curvature in the range of about 25-125 mils, said second structure having smooth sidewalls substantially free of faceting thereby preventing the scattering of light propagating therethrough into untrapped modes,
   said arcuate structures having radii of curvature that lie in a plane parallel to said substrate surface.

6. A structure as set forth in claim 5, wherein said composition of said waveguide structure comprises a Group III-V semiconductor material.

7. A structure as set forth in claim 5, wherein the single heterojunction arcuate waveguide structure is encapsulated by a third semiconductor structure having a relatively low index of refraction as compared to the refractive index of the second semiconductor light confining arcuate structure.

8. A structure as set forth in claim 7, wherein said composition of said waveguide structure comprises a Group III-V semiconductor material.

9. An integrated optical circuit of semiconductor material comprising:
   a substrate of semiconductor material having a planarized surface,
   at least one active optical device grown onto the planar surface of said substrate, and
   at least one arcuate optical waveguide of semiconductor material epitaxially grown connecting to said active optical device on said substrate surface,
   said waveguide having a radius of curvature in the range of about 25-125 mils, said waveguide having smooth sidewalls substantially free of faceting thereby preventing the scattering of light propagating therethrough into untrapped modes.

10. A circuit as set forth in claim 9 wherein said optical devices are selected from a group of lasers, modulators, directional couplers, and switches.

11. A circuit as set forth in claim 9, wherein said arcuate waveguides are suitable for carrying light information between active optical devices.

* * * * *